United States Patent [19]

Akashi et al.

[11] 4,016,903
[45] Apr. 12, 1977

[54] PILOT OPERATED PRESSURE AND VACUUM RELIEF VALVE

[75] Inventors: Mitsumasa Akashi, Kamakura; Toshio Makio, Wako, both of Japan

[73] Assignee: Kabushiki Kaisha Komatsu Seisakusho, Tokyo, Japan

[22] Filed: Dec. 1, 1975

[21] Appl. No.: 636,595

[30] Foreign Application Priority Data

Nov. 29, 1974 Japan .................. 49-143399[U]

[52] U.S. Cl. .................. 137/493.5; 137/493.6; 137/493.9
[51] Int. Cl.² ..................................... F16K 17/26
[58] Field of Search ............ 137/493.6, 493, 493.9, 137/493.5, 493.4, 538

[56] References Cited

UNITED STATES PATENTS

| | | | |
|---|---|---|---|
| 2,501,730 | 3/1950 | McClure | 137/538 |
| 3,100,503 | 8/1963 | Tennis | 137/493 X |
| 3,112,763 | 12/1963 | Tennis et al. | 137/493.6 X |

*Primary Examiner*—Irwin C. Cohen
*Attorney, Agent, or Firm*—Armstrong, Nikaido & Marmelstein

[57] ABSTRACT

A pilot operated pressure and vacuum relief valve which is adapted to open both at times when fluid pressure in a system in which the valve is connected exceeds a predetermined high value and at times when such pressure falls below a predetermined lower value.

Said valve comprises a housing, a first valve means slidably inserted in said housing, a second valve means slidably inserted in said first valve means, a regulating member inserted in said first and second valve means, extending from the front end portion to rear end portion of said first valve means, and first and second springs disposed in said housing and said first valve means located and constructed so as to bias said first valve means and said second valve means respectively.

2 Claims, 2 Drawing Figures

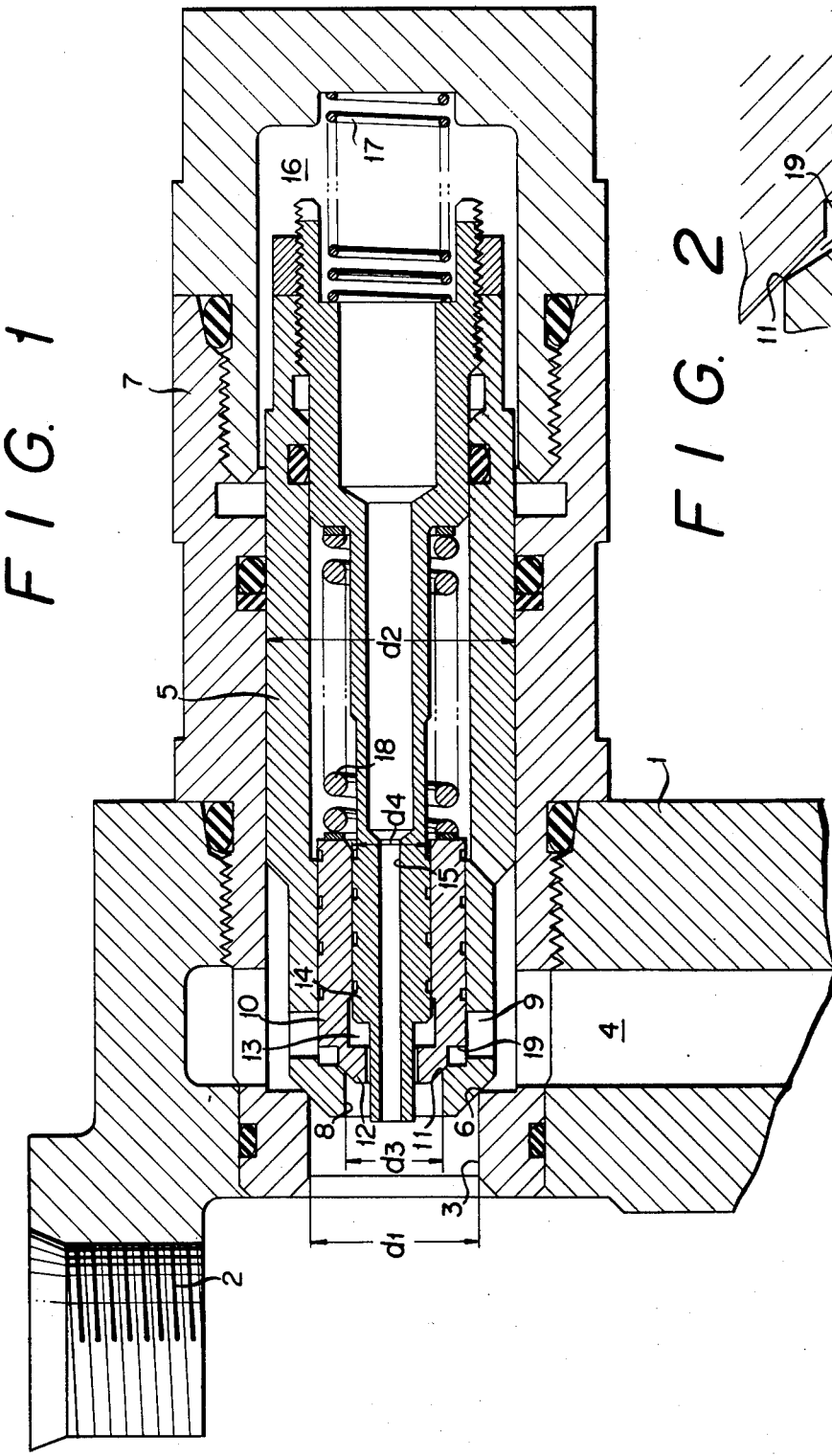
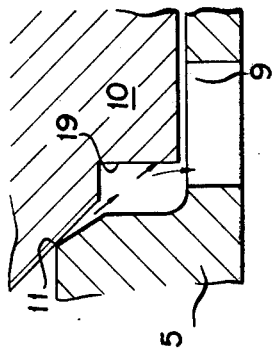
FIG. 1
FIG. 2

PILOT OPERATED PRESSURE AND VACUUM RELIEF VALVE

BACKGROUND OF THE INVENTION

This invention relates to a pilot operated pressure and vacuum relief valve for use with hydraulically controlled valves by disposing said pilot valve in the actuator ports of said hydraulically controlled valves.

Such a valve may be regarded as a combined pressure and vacuum relief valve since it is usually so connected in a fluid pressure system that its opening effects communication of the system with a reservoir or other source of fluid which is unpressurized or at atmospheric pressure. Thus, when system pressures are excessively high, the valve allows fluid from the system to flow to the reservoir or drain, and when the pressure of fluid in the system falls below that of fluid in the reservoir, the valve likewise opens to permit fluid from the reservoir to flow into the system. This kind of valve is disclosed in U.S. Pat. Nos. such as 2,989,072 to Banker and 3,100,503 to Tennis and also disclosed in Japanese patent publication Nos. 36-2635 and 38-1911.

SUMMARY OF THE INVENTION

It is, therefor, a primary object of the present invention to provide a safety valve to prevent occurrence of both unexpected high pressure and vacuum pressure in actuator ports of a valve system.

It is an another object of the present invention to provide a safety valve in which no flow force may occur in a valve system when relieving an unexpected high pressure.

It is still an another object of the present invention to provide a safety valve having the above described desirable capabilities and characteristics but which is nevertheless simple and inexpensive to manufacture, rugged and dependable in operation, and capable of being easily mounted in a hydraulic system reservoir and connected with a pressurized portion of the system by a single duct.

Other objects, features and advantages of the present invention will be readily apparent from the following description taken in conjunction with the accompanying drawings.

BRIEF DESCRIPTION OF THE DRAWINGS

FIG. 1 is a longitudinal cross sectional view of the present invention.

FIG. 2 is an enlarged cross sectional view of the part showing the shoulder structure of the present invention.

DETAILED DESCRIPTION OF THE PREFERRED EMBODIMENTS

In the attached drawing, numeral 1 represents the valve body of an oil-hydraulic operating valve and numeral 2 represents its actuator port. To this actuator port 2 is connected a valve body leading hole 3 and a drain hole 4 which connect the hole 3 and a tank (not shown). Numeral 5 represents a first valve with an outside diameter $d_2$ which stops and opens the connection of the valve body leading hole 3 with the drain hole 4 by contacting and separating with and from the seat 6 provided on the drain hole side of the valve body leading hole 3 and this first valve is installed so as to be free to slide in a housing 7 screwed in the valve body 1. The first valve 5 is a hollow valve provided on its extreme end with a valve leading hole 8 with an inside diameter $d_3$ placed in an opposed manner to the aforesaid valve leading hole 3 and further, a hole 9 is also provided which connects this valve leading hole 8 and drain hole 4 of the valve body 1. Further, inside this first valve 5 is installed, so as to be free to slide, a second valve 10. The valve leading hole 8 and hole 9 are connected and interrupted in their connection by means of the extreme end of the second valve 10 which contacts and separates from the valve seat 11 constructed inside the aforesaid valve leading hole 8 in an apposed manner. In the second valve 10 is constructed a back pressure room 13 with the inside diameter $d_4$ which is connected with the valve leading hole 8 through a hole 12 and in this back pressure room 13 is installed a regulating member 14 which is screwed in the other extreme end of the first valve 5 and additionally, the extreme end of this regulating member 14 is engaged in the hole 12 of the aforesaid second valve 10, the clearance between its outside diameter and the inside diameter of the hole 12 comprising a throttling portion which connects the leading hole 8 and back pressure room 13. Along the center line of the regulating member 14 is provided with a hole 15 which connects the valve leading hole 3 and the pressure leading room 16 located on the rear surface of the first valve 5. Further, between this regulating member 14 and housing 7 is inserted a spring 17 that brings, under pressure, the first valve 5 into contact with the seat 6 and, additionally, between the regulating member 14 and the second valve 10 is inserted a spring 18 that brings, under pressure, the second valve 10 into contact with the seat 11 of the first valve 5.

Further, the relative order of the aforesaid diameters and other dimensions is $d_2 > d_1 > d_3 > d_4$.

The portion which contacts the seat 11 on the extreme end of the aforesaid second valve 10 is constructed in the way represented in FIG. 2 and a shoulder 19 is formed so as to be located in a position such as to face drain hole 9 located inside the contacting point with the seat 11.

In the construction described in the above, when a unexpectedly high pressure P is generated in the actuator port 2, the pressure P is transmitted to the pressure leading chamber 16 constituting the back surface of the first valve 5 by way of the end surface of the first valve 5 and the hole 15 of the regulating member 14. Here, as the relation $d_2 > d_1$ exists, the first valve 5 is pressed against a seat 6. On the other hand, at this moment, through the throttling portion constructed by a hole 12, the above mentioned unexpectedly high pressure is exerted against the back pressure room 13 also, however, as the relation $d_3 > d_4$ exists, the pressing force acting on the end surface of the second valve 10 becomes greater than the pressing force acting on the back pressure room 13 and subsequently, when this particular force exceeds the energizing force of the spring 18, the second valve 10 is displaced against the spring 18 and the oil pressure of the actuator port 2 is drained to the drain hole 4 from the valve leading hole 8 through the hole 9. At this moment, as shown in FIG. 2, the oil is allowed to flow out, with force, through the clearance between the seat 11 and the extreme end of the second valve 10. After flowing along the tapered portion of the extreme end of the valve 10, the oil impinges against the rear shoulder 19 and subsequently the oil is led to the hole 9.

When a depression Po is generated in the actuator port 2, this depression Po acts on the pressure leading chamber 16 in the same way as described above. As the relation $d_2 > d_1$ exists, the attractive force in the pressure leading chamber 16 becomes stronger than the depression and thus, the first valve 5 is adapted to be displaced to the side of the pressure leading chamber 16 to connect the valve body leading hole 3 and the drain hole 4 and the oil inside the tank is drawn to the actuator port 2 through the drain hole 4 and the depression Po is eliminated.

The present invention is provided with the distinctive features that, in the housing 7 fixed securely to the valve body 1 is installed a pressure leading chamber 16 which, between the bottom of the housing 7, is connected to the ports, such as the actuator port 2 of the valve body 1, and the first valve 5 is installed so as to be free to slide and the extreme end of the first valve 5 is contacted with the seat 6 of the valve body leading hole 3 which is located in the valve body 1 in order to connect the aforesaid port 2 with the drain 4 and, additionally, whose cross sectional area is made smaller than that of the aforesaid pressure leading chamber 16. By means of connection and disconnection of the above mentioned extreme end of the valve 5 and the seat, connection and disconnection of the valve body leading hole 3 and the drain hole 4 are caused by the aid of an energizing spring 17 and, further, on the extreme end of the first valve 5 is provided a valve leading hole 8 which is oriented in an opposed manner against to the aforesaid valve body leading hole 3. The hole 8 is oriented in an opposed manner to the drain hole 4 and, at the same time, inside this first valve 5. The second valve 10 which connects and disconnects the above mentioned valve leading hole 8 and the hole 9 by means of connection and disconnection is urged by the energizing spring 18 against the seat 11 located inside the valve leading hole 8 and on the opposite side of the second valve 10 with respect to the valve leading hole 8 and the back pressure room 13, which is provided with the cross sectional area smaller than the valve leading hole 8, and this structure is further connected with the actuator port 2 by way of a throttling portion and a safety valve construction is built up by providing the shoulder 19 on the extreme end of the aforesaid second valve 10 with the shoulder being located inside the contacting point of the seat 11 and receiving the impinging flow from the aforesaid seat 11. Consequently, an unexpectedly high pressure generated in the actuator port 2 of the valve body 1 is drained by the action of the second valve 10 and, further, any depression is eliminated by the suction pressure through the drain hole 4 by the action of the first valve 5 and by these arrangements, with a single safety valve construction, both an unexpectedly high pressure and a depression pressure are prevented, thus creating the advantage of simplification of construction by installing a single safety valve construction for preventing both an unexpectedly high pressure and a depression pressure and further, realizing the advantage of simplification of fabrication and construction of an oil-hydraulic operating valve.

Further, when the aforesaid unexpected high pressure is generated, the oil pressure flowing from the seat 11, by displacing the second valve 10, impinges against the shoulder part 19 of the second valve 10 and thus, the flow force caused by action of the relief at the time of the aforesaid unexpected high pressure is kept from acting on the second valve 10, thus improving the flow-pressure characteristic.

What is claimed is:

1. A pilot operated pressure and vacuum relief valve comprising a housing having a bore in it;

a first vacuum responsive valve means slidably inserted in the bore of said housing;

a system port having a diameter $d_1$ provided at the front end portion of said housing, said system port being connectable with a portion of a hydraulic system in which varying fluid pressures may be developed;

a drain port opening from the front end portion of said housing and communicating with said system port through an annular rearwardly facing valve seat provided at the front portion of said housing;

a first back pressure room having a diameter $d_2$ defined in said housing between a rear surface portion of said first valve means and a rear surface of the bore of said housing;

a second pressure responsive valve means slidably inserted in said first valve means, a front end portion of said second valve means facing the annular valve seat of said housing;

a regulating member inserted in said first and second valve means, extending from the front portion to rear portion of said first valve means and having a hole therethrough so as to communicate said first back pressure room with said system port, said regulating member being threaded at the rear portion thereof and being engaged with a threaded portion of said first valve means;

a second back pressure room defined in said second valve means and communicating with said system port via a throttling portion formed between said second valve means and said regulating member;

a first spring means disposed between the rear portion of said regulating member and the rear surface of the bore of said housing, said first spring means exerting a spring force against the rear portion of said regulating member so as to bias said first valve means against the annular valve seat of said housing;

a second spring means disposed in said first valve means between said second valve means and said regulating member to bias said second valve means against an annular valve seat located on said first valve means;

means for communicating said system port with said drain port through a path between the annular valve seat of said first valve means and the front portion of said second valve means when the pressure in said system port exceeds a predetermined level;

means for communicating said system port with said drain port through a path between the annular valve face of said housing and the front end portion of said first valve means when a vacuum pressure is developed in said system port; and said first valve means has an inlet port located therein opening to said annular valve seat of said first valve means with a diameter $d_3$ at the front portion thereof and said second back pressure room having a diameter $d_4$, and wherein the relationship of said diameters is $d_2 > d_1 > d_3 > d_4$.

2. A pilot operated pressure and vacuum relief valve of claim 1, wherein said second valve means has a shoulder facing the annular valve seat of said first valve means.

* * * * *